(12) United States Patent
Buchter

(10) Patent No.: US 12,000,781 B2
(45) Date of Patent: Jun. 4, 2024

(54) MULTISPECTRAL LiDAR TRANSCEIVER

(71) Applicant: IRIDESENSE, Issy-les-Moulineaux (FR)

(72) Inventor: Scott Buchter, Espoo (FI)

(73) Assignee: IRIDESENSE, Issy-les-Moulineaux (FR)

( * ) Notice: Subject to any disclaimer, the term of this patent is extended or adjusted under 35 U.S.C. 154(b) by 846 days.

(21) Appl. No.: 16/981,795

(22) PCT Filed: Mar. 19, 2019

(86) PCT No.: PCT/EP2019/056841
§ 371 (c)(1),
(2) Date: Sep. 17, 2020

(87) PCT Pub. No.: WO2019/180019
PCT Pub. Date: Sep. 26, 2019

(65) Prior Publication Data
US 2021/0041537 A1     Feb. 11, 2021

Related U.S. Application Data

(60) Provisional application No. 62/745,370, filed on Oct. 14, 2018, provisional application No. 62/644,746, filed on Mar. 19, 2018.

(51) Int. Cl.
*G01N 21/55*     (2014.01)
*B60W 30/095*   (2012.01)
(Continued)

(52) U.S. Cl.
CPC ......... *G01N 21/55* (2013.01); *B60W 30/0956* (2013.01); *B60W 60/001* (2020.02);
(Continued)

(58) Field of Classification Search
None
See application file for complete search history.

(56) References Cited

U.S. PATENT DOCUMENTS 8,269,652 B2    9/2012 Seder et al.
10,948,598 B1 *  3/2021 Prabhakar ............. G01S 7/4817
(Continued)

FOREIGN PATENT DOCUMENTS

JP    2014095630 A    5/2014
JP    2017138813 A    8/2017

OTHER PUBLICATIONS

Hakala, Teemu and 3 others, "Full waveform hyperspectral LiDAR for terrestrial laser scanning", Optics Express, vol. 20, Issue 7, Mar. 13, 2012, pp. 7119-7127.
(Continued)

*Primary Examiner* — Luke D Ratcliffe
(74) *Attorney, Agent, or Firm* — Daylight Law, P.C.

(57) ABSTRACT

A scanning device for laser detection and ranging (LiDAR), the scanning device includes, arranged in optical free space:
   an optical input for receiving a pulsed broadband laser beam having a linear polarization;
   a separating unit configured for transmitting the laser beam along a scanning optical path while changing the polarization into a circular one;
   a wavelength selection unit; and
   a scanning unit.
The separating unit is configured for deviating the reflections (4) on a broadband detector while changing the orthogonal circular polarization into an orthogonal linear polarization compared to the linear polarization of the laser beam. The broadband detector is configured to receive the deviated reflections, and to detect a time-of-flight and an optical power of the light reflection.

24 Claims, 4 Drawing Sheets

(51) Int. Cl.
*B60W 60/00* (2020.01)
*G01S 7/481* (2006.01)
*G01S 17/08* (2006.01)
*G01S 17/86* (2020.01)
*G01S 17/894* (2020.01)
*G06T 17/00* (2006.01)
*G06T 19/20* (2011.01)
*G06V 20/58* (2022.01)

(52) U.S. Cl.
CPC .......... *G01S 7/4814* (2013.01); *G01S 7/4816* (2013.01); *G01S 7/4817* (2013.01); *G01S 17/08* (2013.01); *G01S 17/894* (2020.01); *G06T 17/00* (2013.01); *G06T 19/20* (2013.01); *G06V 20/58* (2022.01); *B60W 2420/408* (2024.01); *B60W 2420/54* (2013.01); *G01N 2201/06113* (2013.01); *G01S 17/86* (2020.01); *G06T 2210/56* (2013.01); *G06T 2219/2004* (2013.01); *G06V 2201/07* (2022.01)

(56) References Cited

U.S. PATENT DOCUMENTS

| | | | | |
|---|---|---|---|---|
| 11,061,220 B2* | 7/2021 | Blanche | ............... | G02B 26/101 |
| 11,698,445 B2* | 7/2023 | Philipp | ................... | G01S 7/499 |
| | | | | 356/5.01 |
| 2004/0264515 A1* | 12/2004 | Chang | ..................... | H01S 5/141 |
| | | | | 372/20 |
| 2016/0084945 A1 | 3/2016 | Rodrigo et al. | | |
| 2017/0269215 A1* | 9/2017 | Hall | ....................... | G01S 17/89 |
| 2017/0307736 A1* | 10/2017 | Donovan | .............. | G01S 7/4815 |
| 2017/0364758 A1 | 12/2017 | Minster | | |
| 2020/0333533 A1* | 10/2020 | Rogers | .................... | G01S 17/89 |
| 2020/0400789 A1* | 12/2020 | DeMersseman | ...... | G01S 7/4813 |

OTHER PUBLICATIONS

Martinez-Ramirez, Daniel and 7 others, "Developing Hyperspectral LiDAR for Structural and Biochemical Analysis of Forest Data", 32nd European Association of Remote Sensing Lobaratories Symposium (Earsel 2012) Advances in Geosciences [ISBN:978-1-62748-544-9], 2013, pp. 333-343.

International Search Report and Written Opinion dated Jun. 7, 2019 from International Application No. PCT/EP2019/056841, 8 pages.

* cited by examiner

MULTISPECTRAL LiDAR TRANSCEIVER

CROSS REFERENCE TO RELATED APPLICATIONS

This application is a 35 U.S.C. § 371 National Stage of International Application No. PCT/EP2019/056841, filed Mar. 19, 2019, which claims priority to U.S. Provisional Patent Application No. 62/644,746 filed Mar. 19, 2018 and U.S. Provisional Patent Application No. 62/745,370 filed Oct. 14, 2018, all of which are incorporated by reference in their entirety herein for all purposes.

BACKGROUND

The invention relates to methods and systems for multispectral laser detection and ranging (LiDAR).

In a typical LiDAR system, the transmitted signal is a spectrally fixed, narrow band light source. In order to reduce the influence of background light, for instance from the sun, a narrow band filter can be placed in the receiver path. In the case of multispectral LiDAR's the mitigation of interference from background light is particularly difficult. This is because the transmitter either has a broad spectral width or is rapidly tuning to different wavelengths. In the first case, a significant amount of power does not contribute to the LiDAR function as it is blocked by the tunable receiver. This can raise eye safety concerns in certain applications. In the second case, the tunable receiver must be precisely synchronized to the transmitter light source. In practice this is complicated to achieve.

SUMMARY OF THE INVENTION

Specific embodiments of the invention provide a simplified multispectral LiDAR transceiver, that significantly improves background rejection, reduces crosstalk, and improves eye safety compared with the state of the art, for instance for scanning in color and in real-time the surroundings of an autonomous vehicle.

It is proposed a scanning device for laser detection and ranging (LiDAR), the scanning device comprising, arranged in optical free space:
  an optical input for receiving a pulsed broadband laser beam, the laser beam having a linear polarization
  a separating unit configured for transmitting the laser beam along a scanning optical path while changing the polarization into a circular one,
  a wavelength selection unit configured for:
    receiving the laser beam from the separating unit, and filtering the laser beam in order to get a filtered laser beam having a current wavelength that can be selected among a plurality of selectable wavelengths, and
    deflecting the filtered laser beam on a scanning unit along the scanning optical path,
  the scanning unit being configured:
    to steer the deflected filtered laser beam along a plurality of current local directions inside a predefined solid angle, and
    to receive reflections of the filtered laser beam, the reflections having an orthogonal circular polarization compared to the circular polarization of the laser beam,
    to transmit back the received reflections to the separating unit through the wavelength selection unit along a detection optical path, wherein the detection optical path and the scanning optical path have a same light path through the wavelength selection unit and the scanning unit, but opposite direction of light propagation,
  wherein the separating unit is further configured for deviating the reflections on a broadband detector while changing the orthogonal circular polarization into an orthogonal linear polarization compared to the linear polarization of the laser beam,
  the broadband detector being configured:
    to receive the deviated reflections, and
    to detect a time-of-flight and an optical power of the light reflection.

One would understand that a reflection of the filtered laser beam refers to either back-scattered or specular reflection or combination thereof.

According to embodiments, the above-mentioned scanning device may comprise one or more of the following features that can be optionally implemented, separately or in combination one with the others.

In embodiments, the broadband detector is a unique detector.

Thanks to this feature, all the received amount of power of the reflection of the filtered laser beam may contribute to the LiDAR function instead of being blocked by a tunable receiver. Moreover, the broadband detector may be synchronized to the broadband light source with no requirements on the spectra, which eases the use of the scanning device compared to the prior art.

In embodiments, the separating unit comprises:
  a polarizing beamsplitter configured to perform said transmitting of the laser beam along the scanning optical path and deviating of the light reflection along the detection optical path
  an optical component being disposed on the same light path between the polarizing beamsplitter and the wavelength selection unit and being configured to convert a linear polarization into a circular polarization along the scanning optical path and to convert an orthogonal circular polarization into an orthogonal linear polarization along the detection optical path.

The optical component is a quarter waveplate. The polarizing beamsplitter is a dielectric polarizing beamsplitter cube.

In embodiments, the reflections are deviated at a predefined angle compared to the laser beam transmission. In a preferred embodiment, the predefined angle is 90°. There is a variety of monochromators that can be used to implement the wavelength selection unit. For instance, the wavelength selection unit may comprise a prism. In a preferred embodiment, the wavelength selection unit comprises a grating for diffracting the broadband laser beam, and a mirror, one of the grating and the mirror being orientable, whose orientation is adjustable in order to select a 1st order of a selected wavelength diffracted beam.

In embodiments, a selected wavelength diffracted beam has a FWHM up to 30 nm, preferably up to 20 nm, preferably comprised in the range [10 nm-20 nm].

In embodiments, the selectable wavelengths of the plurality are spaced with each other by at least 10 nm, preferably 15 nm, preferably again 20 nm.

In embodiments, the selectable wavelengths of the plurality are in the range of 900 nm to 1700 nm.

In embodiments, the plurality of selectable wavelengths comprises at least three wavelengths, preferably at least five wavelengths, more preferably at least ten wavelengths. Thanks to these features, an interesting spectral response may be obtained, respectively a more precise spectral response more preferably again, and a more complete spectral response.

In embodiments, the scanning device further comprises a broadband laser source configured to send the pulsed broadband laser beam to the separating unit through the optical input.

In embodiments, the predefined solid angle has an horizontal angular dimension in the range [45 degrees-360 degrees] and a vertical angular dimension in the range [10 degrees-180 degrees], preferably an horizontal angular dimension in the range [90 degrees-180 degrees] and a vertical angular dimension in the range [20 degrees-90 degrees], and more preferably an horizontal angular dimension about 120 degrees and a vertical angular dimension about 30 degrees.

In embodiments, the scanning device further comprises:
a memory configured to store a set of wavelength values corresponding to the plurality of selectable wavelengths,
the scanning device further comprising
processing means configured for the scanning device to successively select a wavelength current value in the set of wavelength values at a wavelength rate, wherein the wavelength rate is preferably higher than 3 Hz,
controlling means configured to control the wavelength selection unit in order to tune the wavelength selection unit to the wavelength current value.

The scanning device may be configured for example to scan repeatedly into the entire predefined solid angle by changing the wavelength at each repeated entire scan.

Thanks to this feature, the scanning device may detect images of the surroundings in at least three colors, at a rate above one colored image per second. In a preferred embodiment, the scanning device is configured to detect at least 3 images per second, and even preferably at least 4 images per second.

By the wording "image", one would understand the image of the surroundings that intersects the solid-angle cone.

In embodiments, the scanning device further comprises:
driving means configured to control the scanning unit for steering said deflected filtered laser beam along said plurality of current local directions inside said predefined solid angle,
a memory, the scanning device being further configured to record in the memory an optical power and a time-of-flight in relation with the current wavelength value and coordinates of the current local direction.

In embodiments, the scanning unit is further configured for:
vertically scanning the entire vertical angular dimension of the solid angle, the vertical scanning being repeatedly performed at a vertical scan frequency, and
horizontally scanning the entire horizontal angular dimension of the solid angle, the horizontal scanning being repeatedly performed at a horizontal scan frequency.

For instance, one may set at first the vertical scan frequency. For example, the vertical scan frequency is equal to 30 Hz, meaning that a single vertical scanning is performed in 0.033 s.

Then, one may set a predetermined number of elementary vertical lines (in other words, one may set the number of division of the vertical angular dimension of the solid angle into elementary vertical angular steps). For example, the predetermined number is equal to 100.

Therefore, each elementary line scan should take a duration equal to the inverse of the vertical scan frequency, divided by the predetermined number. In the previous examples (30 Hz, 100), the duration is equal to 0.33 ms.

Therefore, horizontally scanning the entire horizontal angular dimension of the solid angle, i.e. the elementary line, should be performed in the same duration (i.e. in the example, in 0.33 ms).

Therefore, the horizontal scan frequency should be set equal to the inverse of the duration. In the example, the horizontal scan frequency should be set equal to 3 khz.

Further, one may set a predetermined number of measure points along each elementary vertical line. The laser frequency should then be set equal to the horizontal scan frequency multiplied by the number of measure points.

For instance, one can set a number of measure points equal to 100. In such a case, the laser frequency should be set equal to around 300 khz.

The above numerical example states example values for the sake of illustration. More generally, the predetermined number of elementary vertical lines is set above 30, the predetermined number of measure points is set above 100, and the laser frequency is set above 300 kHz. In a preferred embodiment, the laser frequency is set above 1 MHz.

The above example states that the vertical scanning is not continuous but discrete, each elementary vertical line being separated by a vertical angular step, whereas the horizontal scanning is continuous. In another example, one may set the scanning device in order to obtain the opposite: i.e. a continuous vertical scanning and a discrete horizontal scanning.

Same example of calculations may be performed by setting at first the laser frequency and the number of measure points instead of setting at first the vertical scan frequency.

In embodiments, the wavelength rate is lower than the horizontal scan frequency and the vertical scan frequency. For instance, the horizontal scan frequency is preferably at least 10 times higher than the wavelength rate. Preferably, the horizontal scan frequency is higher than 100 times the wavelength rate.

Thus, the scanning device may be configured for example to scan repeatedly into the entire predefined solid angle by changing the wavelength at each repeated entire scan.

Thanks to these features, a high rate for repeatedly scanning may be reached compared to the prior art. Such a high rate enables a good real-time monitoring of the surrounding of a vehicle.

Thanks to these features, colored imaging of the surrounding may be obtained in real-time, for example for the application of autonomous vehicle. By the wording "real-time", one would understand at least 3 images (i.e. entire scan) per second.

In an alternative embodiment, the wavelength rate may be set higher than the horizontal scan frequency and the vertical scan frequency. For instance, the wavelength rate may have a high frequency, whereas the horizontal scanning frequency and vertical scanning frequency may have a lower rate. For instance, the scanning device may be configured to change the wavelength at least 3 times at each measure point, prior to move to the next current local direction.

The scanning device as described above is particularly useful for many applications. In a preferred application, the scanning device is disposed on or embedded in a vehicle, for instance an autonomous vehicle.

The invention also provides a vehicle comprising a scanning device as described hereinabove.

The invention also provides a method for operating the scanning device for laser detection and ranging (LiDAR) according to any of the preceding claims, the method comprising:

successively selecting a wavelength current value in the set of wavelength values at a wavelength rate, vertically scanning the entire vertical angular dimension of the solid angle, the vertical scanning being repeatedly performed at a vertical scan frequency, and horizontally scanning the entire horizontal angular dimension of the solid angle, the horizontal scanning being repeatedly performed at a horizontal scan frequency, wherein the wavelength rate is lower than the horizontal scan frequency and the vertical scan frequency.

Other features, details and advantages will be shown in the following detailed description and on the figures.

DETAILED DESCRIPTION

Figures and the following detailed description contain, essentially, some exact elements. They can be used to enhance the understanding of the invention and, also, to define the invention if necessary.

Figure 1:
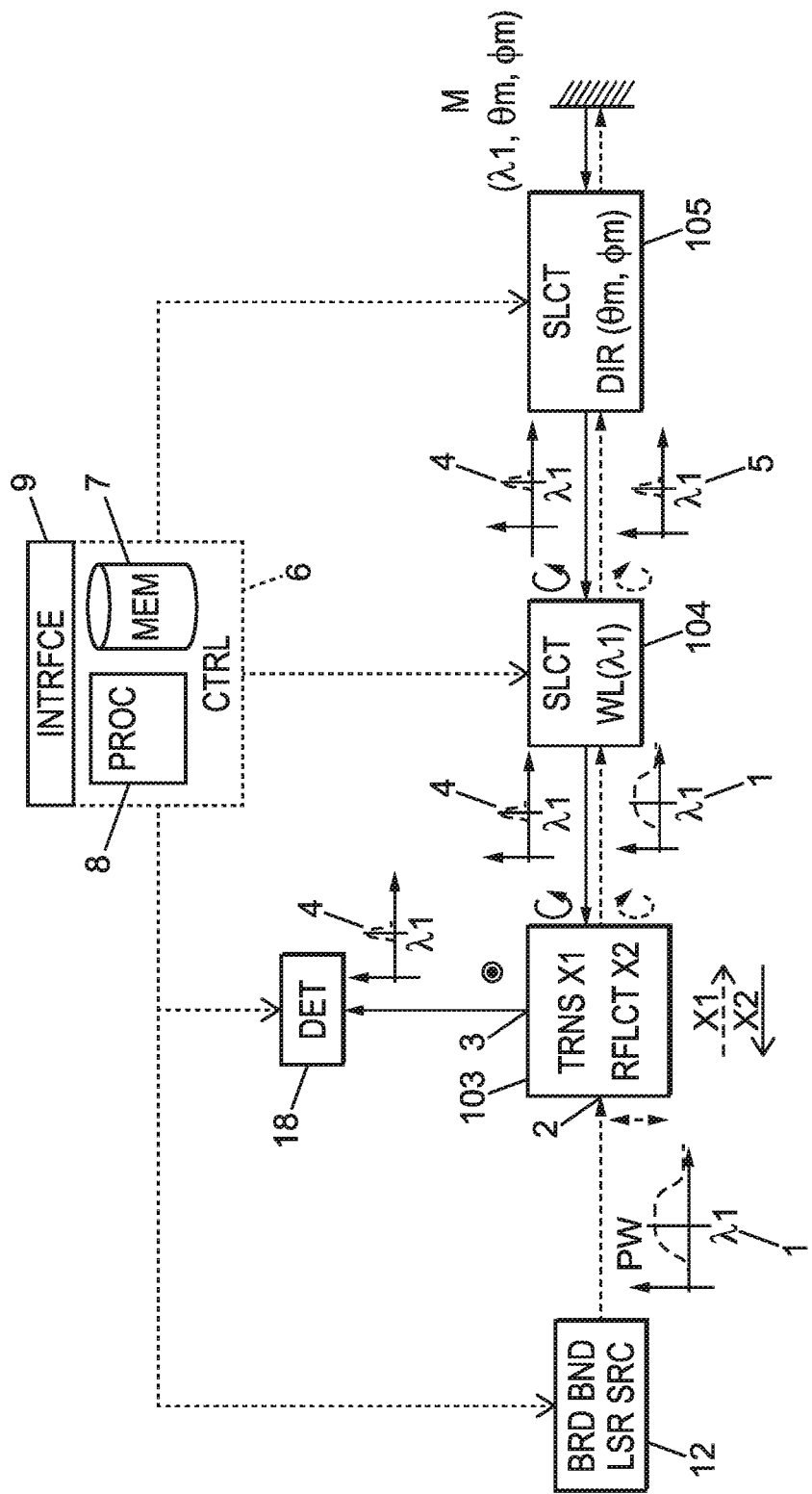
FIG. 1 is an optical functional schematic view of a multispectral LiDAR device in accordance with specific embodiments of the invention disclosed herein.

As represented on FIG. 1, it is provided a multispectral LiDAR device intended to be vehicle embedded, or at least on-board into a vehicle. The multispectral LiDAR device enables to detect the surroundings of the vehicle by getting reflected images of the surroundings for a variety of wavelengths.

The multispectral LiDAR device operates in free space, which means that the different optical components comprised in the multispectral LiDAR device are not optical fibered with each other.

The multispectral LiDAR device comprises a broadband laser source 12, configured to emit a pulsed broadband laser beam. For instance, the broadband laser source 12 may comprise a monochromatic laser source and an optical non-linear unit configured to spread the spectrum of the monochromatic laser source by means of non-linear optical effects.

The incoming broadband laser beam is represented by its spectral envelope 1 including namely a first wavelength channel of wavelength $\lambda 1$. For the sake of simplicity, reference number designating laser beams, for instance the broadband laser beam 1 will be used indifferently to designate either the laser beam or the spectral envelope of said laser beam.

The multispectral LiDAR device further comprises a control unit 6. The control unit 6 comprises processing means 8, for example a processor, a data repository 7, for example a memory, and a control interface 9 for accessing the detected image and optionally for receiving instructions. The control unit 6 may be implemented in a unitary or distributed manner. Part of the control unit 6 may be not implemented on-board.

The control unit 6 is configured for controlling the emission of the broadband laser source 12, for instance in an ON/OFF mode.

The multispectral LiDAR device further comprises a separating unit 103. The broadband laser source 12 is optically connected to the separating unit 103 such that the separating unit 103 receives, by an optical input 2 of the separating unit 103, the broadband laser beam 1.

The separating unit 103 is configured to transmit the broadband laser beam 1 in a light propagation direction X1.

The multispectral LiDAR device further comprises a wavelength selection unit 104 optically connected to the separating unit 103 such that the wavelength selection unit 104 is configured to receive the broadband laser beam 1.

The wavelength selection unit 104 is configured to filter the received broadband laser beam 1 according to an adjustable filtering spectral window, in order to select an adjustable wavelength channel among a plurality of selectable wavelength channels. The plurality of selectable wavelength channels may comprise at least two or three wavelength channels.

Figure 6:
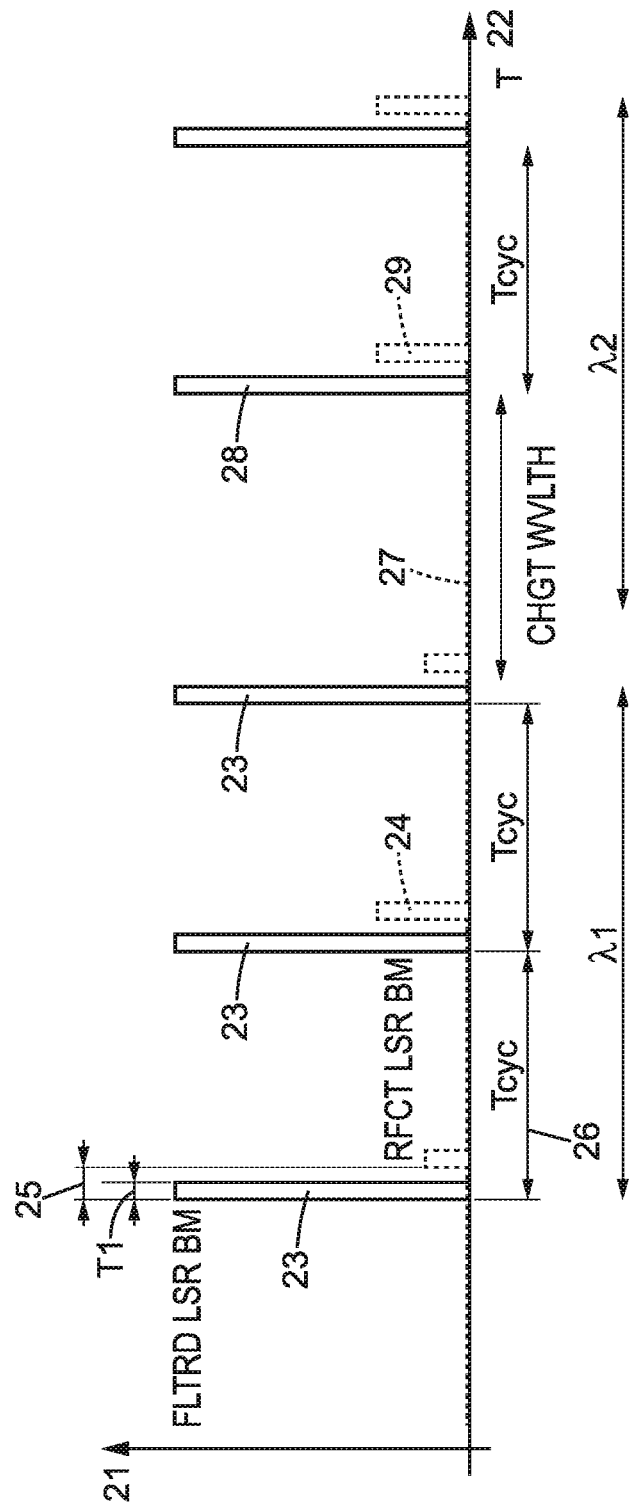
FIG. 6 is a schematic of a train of monochromatic pulses generated by the multispectral LiDAR device of FIG. 1 and of a reflected train of monochromatic pulses received by the multispectral LiDAR device, in accordance with specific embodiments of the invention disclosed herein.

FIG. 6 represents the monochromatic train of optical pulses 23, 28 outputted from the wavelength selection unit 104. The vertical axis 21 represents the optical power over the time 22. The optical pulses are periodically emitted according to a period 26 Tcyc=1 µs. The laser frequency is 1 MHz. For instance, a time lapse T1 of the bursts is 1 ns.

As represented, the wavelength may be changed from a first wavelength $\lambda 1$ to a second wavelength $\lambda 2$. The three represented successive pulses 23 are pulses of wavelength $\lambda 1$ whereas the two successive last pulses are pulses of wavelength $\lambda 2$. A changing period 27 between the two trains of pulses of different wavelength is represented that may exceed the duration of the period 26 Tcyc. The rate of wavelength change is higher than 3 Hz.

Figure 2:
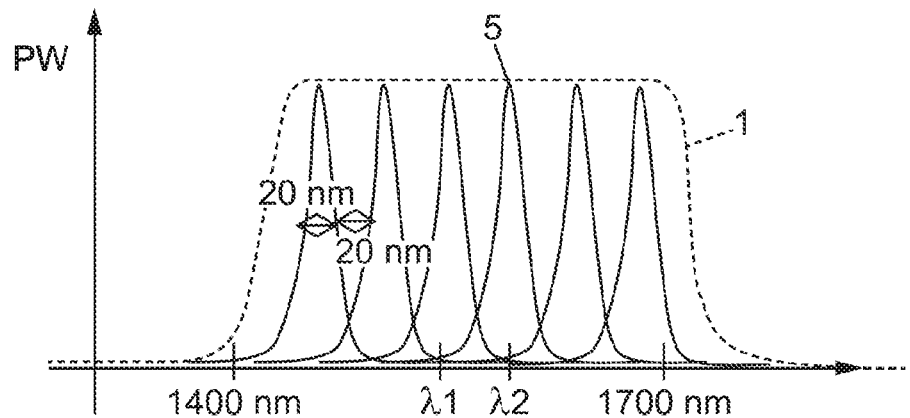
FIG. 2 is an exemplary spectrum of a multispectral comb of selectable wavelengths that can be selected when operating the multispectral LiDAR device of FIG. 1, in accordance with specific embodiments of the invention disclosed herein.

FIG. 2 represents a graph of the power over the wavelength of a comb of six selectable wavelength channels in the spectral envelope of the broadband laser beam 1. Preferably, the spectral envelope has a spectral full width at half maximum (FWHM) around 300 nm, and centered on a central wavelength around 1550 nm.

Thanks to this feature, the eye safety is improved compared to the prior art.

Each wavelength channel may have a FWHM around 20 nm. The free spectral range (FSR) between two adjacent wavelength channels may be for example around 20 nm. However, overlapping of the wavelength channels is possible as well. Adjacent wavelength channels may be separated by non-homogeneous FSR. Adjacent wavelength channels may have non-homogeneous FWHM.

The adjustable filtering spectral window of the wavelength selection unit 104 is selected by means of the control unit 6. In the example of FIG. 1, the selected wavelength channel is the first wavelength channel of wavelength $\lambda 1$.

The wavelength selection unit 104 outputs a filtered laser beam 5 from the broadband laser beam 1. The spectral envelope 5 of the filtered laser beam 5 corresponds to the first wavelength channel of wavelength $\lambda 1$.

The multispectral LiDAR device further comprises a scanning unit 105 optically connected to the wavelength selection unit 104. The scanning unit 105 is configured for receiving the filtered laser beam 5. The scanning unit 105 is further configured for steering the filtered laser beam 5 in any direction comprised in a solid angle of n steradians (sr) centered on an adjustable local direction.

The adjustable local direction of the scanning unit 105 is selected by means of the control unit 6. In the example of FIG. 1, the selected local direction is a direction that reaches an elementary surface M of the surroundings.

The elementary surface M of the surroundings is a diffuse reflective surface for the selected wavelength $\lambda 1$, such that part of the filtered laser beam 5 is back-scattered. The reflection may also be partly specular. The part of the filtered laser beam 5 that is back-scattered or reflected in the opposite direction X2 to the light propagation direction X1 is referred to as a reflected filtered laser beam 4.

The scanning unit 105 is further configured for receiving the reflected filtered laser beam 4 from the elementary surface M.

One would understand that the wording "direction" designates the optical path of light through the multispectral LiDAR device and up to the elementary surface M. One would understand that the wording "opposite direction" designates the reverse collinear optical path of the light propagating back after reflection.

The scanning unit 105 is further configured for transmitting, in the opposite direction X2, the received reflected filtered laser beam 4 to the wavelength selection unit 104.

The wavelength selection unit 104 is still configured to select the same first wavelength channel. Therefore the reflected filtered laser beam 4 passes through the wavelength selection unit 104 with no modification, and reaches the separating unit 103. The separating unit 103 is configured to deflect the reflected filtered laser beam 4 incoming from the opposite direction X2, in the direction of a broadband detector 18.

The multispectral LiDAR device further comprises the broadband detector 18 configured to receive the reflected filtered laser beam 4, and to detect a time-of-flight and an optical power of the reflected filtered laser beam 4.

The train of reflected optical pulses 24, 29 incoming on the broadband detector is represented on FIG. 6. A detected duration 25 between a transmitted optical pulse 23 and its reflected counterpart 24 is used in order to retrieve the time-of-flight.

The train of reflected optical pulses 24, 29 have a very low optical power, measurable in nanowatts or even in photons. Thanks to this feature, the eye safety is improved compared to the prior art.

The broadband detector 18 may be for example an InGaAs Array Photo Diode (APD) of detection range around 900-1700 nm. For instance, a convenient InGaAs APD may be referred G8931-20 by the manufacturer HAMAMATSU®. Such an InGaAs APD may have a photosensitive area dimension around 0.2 mm.

The control unit 6 is configured for controlling the detection of the broadband detector 18, by synchronization with the wavelength selection unit 104.

The multispectral LiDAR device according to the invention is particularly advantageous because the synchronization between the broadband laser source 12 and the broadband detector 18 is either not required or may be less precise as in the prior art, without impacting the quality of the multispectral detection.

An advantageous use of the multispectral LiDAR device according to the invention may comprise:
- a selection of a first wavelength in the plurality of selectable wavelengths,
- a continuous horizontal scanning of the filtered laser beam 5 having the first wavelength on local directions comprised into the solid-angle cone,
- after having scanned each horizontal line, changing the vertical direction by an elementary vertical angular step and reiterated the continuous horizontal scanning for the new horizontal line,
- after having vertically scanned all the horizontal lines, selecting a second wavelength in the plurality of selectable wavelengths, and
- reiterating the horizontal and vertical scanning into the same solid-angle cone.

Advantageously, the control unit 6 of the multispectral LiDAR device is configured in order to perform the advantageous use described hereinabove.

Preferably, in such case, the data repository 7 is configured to store a set of wavelength values comprising at least a first wavelength value and a second value wavelength value. The data repository may further comprise a value of an elementary vertical angular step.

Scanning the whole solid-angle cone with a same first selected wavelength prior to change for a second selected wavelength rather is advantageous because the time required for tuning the scanning device to a different wavelength is lower than the time required for steering the laser to a different local direction. For instance, the frequency of scanning may be of 30 scans of a whole solid-angle cone per second.

Advantageous examples of structural optical elements for implementing the functions of the multispectral LiDAR device described with reference to FIG. 1 are described below, that lead to other advantages.

Figure 3:
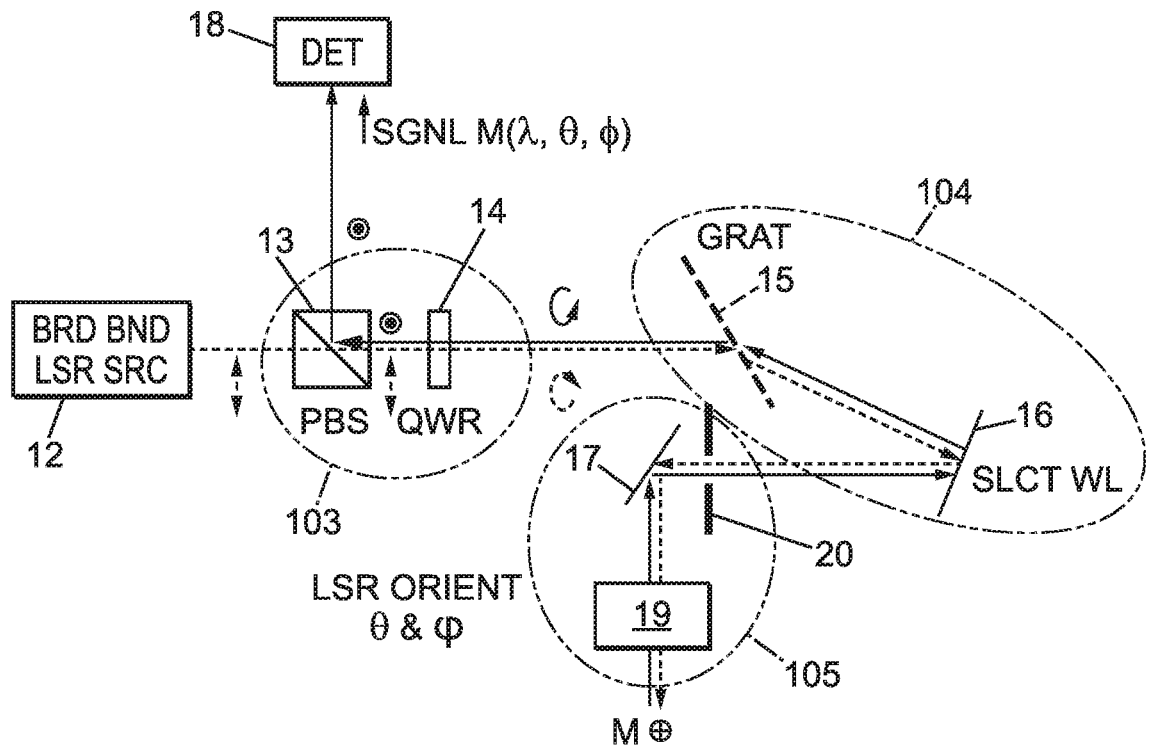
FIG. 3 is a schematic of the multispectral LiDAR device of FIG. 1, with examples of structural optical elements functionally working as in FIG. 1, in accordance with specific embodiments of the invention disclosed herein.

For instance, with reference to FIG. 3, an example of a separating unit 103 is pictured.

In the example, the separating unit 103 comprises a polarizing beamsplitter 13 and a quarter wave plate 14 disposed after the polarizing beamsplitter 13 on the optical direction X1. In the example, the broadband laser source 12 is further configured to emit the broadband laser beam 1 with a linearly p-polarized polarization, as represented on the FIG. 3 by a right dashed-lined arrow.

The polarizing beamsplitter 13 is a dielectric polarizing beamsplitter cube. The polarizing beamsplitter cube is configured to transmit a linearly p-polarized received light and to deflect perpendicularly a linearly s-polarized received light.

Therefore, the broadband laser beam 1 passes through the polarizing beamsplitter 13 and reaches the quarter wave plate 14.

The quarter wave plate 14 is disposed on the optical axis of the polarizing beamsplitter 13 such that its slow and fast axis are arranged at 45° with the s-polarization of the broadband laser beam 1. The slow axis of a retarder is the axis through which the light travels slower, whereas the fast axis of a retarder is the axis through which the light travels faster. In the case of a quarter wave plate, the retardation describes the phase shift (a quarter of the wavelength) between the polarization component projected along the fast axis and the component projected along the slow axis.

The broadband laser beam 1 passes through the quarter wave plate 14 which results in changing the polarization from a linear s-polarization to a circular polarization, as represented on the FIG. 3 by a circular dashed-lined arrow.

When traveling back, the reflected filtered laser beam 4 has an orthogonal circular polarization as the broadband laser beam 1, as represented by the orthogonal circular plain-lined arrow. This is due to the reflection on the elementary surface M.

The reflected filtered laser beam 4 passes through the quarter wave plate 14 in the opposite direction X2, which results in changing the polarization from a orthogonal circular polarization to a linear s-polarization, as represented on the FIG. 3 by a circled dot.

The polarizing beamsplitter cube is further configured to deflect perpendicularly the linearly s-polarized reflected filtered laser beam 4, such that the reflected filtered laser beam 4 reaches the broadband detector 18.

Such an implementation of the separating unit 103 is very advantageous because the orthogonal polarization of the laser beams traveling in two opposite direction lowers the cross talk and therefore improves the detection.

With reference again to FIGS. 4 and 5, an example of a wavelength selection unit 104 is pictured. The wavelength selection unit 104 acts as a monochromator.

The wavelength selection unit 104 may comprise a non-movable diffraction grating 15 disposed on the optical path of the broadband laser beam 1, such that high diffraction efficiency is achieved in either the +1 or −1 diffraction order, for each selectable wavelength channel.

Figure 4:
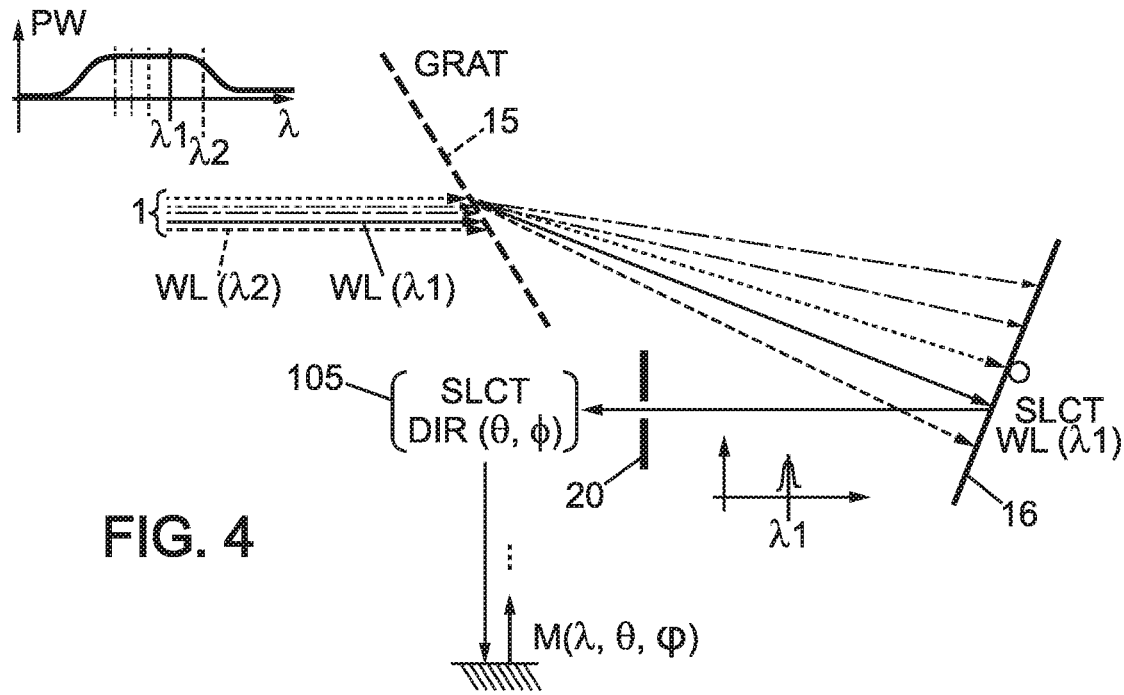
FIG. 4 is a schematic of a detail of the multispectral LiDAR device of FIG. 1 functionally working to select a first wavelength of the comb of FIG. 3, in accordance with specific embodiments of the invention disclosed herein.

FIG. 4 illustrates the broadband laser beam 1 incoming on the diffraction grating 15. Different wavelength channels are represented with different types of plain or dashed or dotted-lines. The plain-line represents the first wavelength channel.

The wavelength selection unit 104 further comprises an orientable scanner mirror 16. First diffraction orders' beams of each wavelength channels are reflected on the orientable scanner mirror 16. A unique non-adjustable selection direction is predefined, that is a direction from the position of the scanner mirror 16 to an input of the scanning unit 105.

The orientable scanner mirror 16 may be oriented in order to reflect the first diffraction order of the selected wavelength channel in the unique non-adjustable selection.

An optical slit 20 is disposed on the path of the unique non-adjustable selection in order to avoid unwanted reflections.

Figure 5:
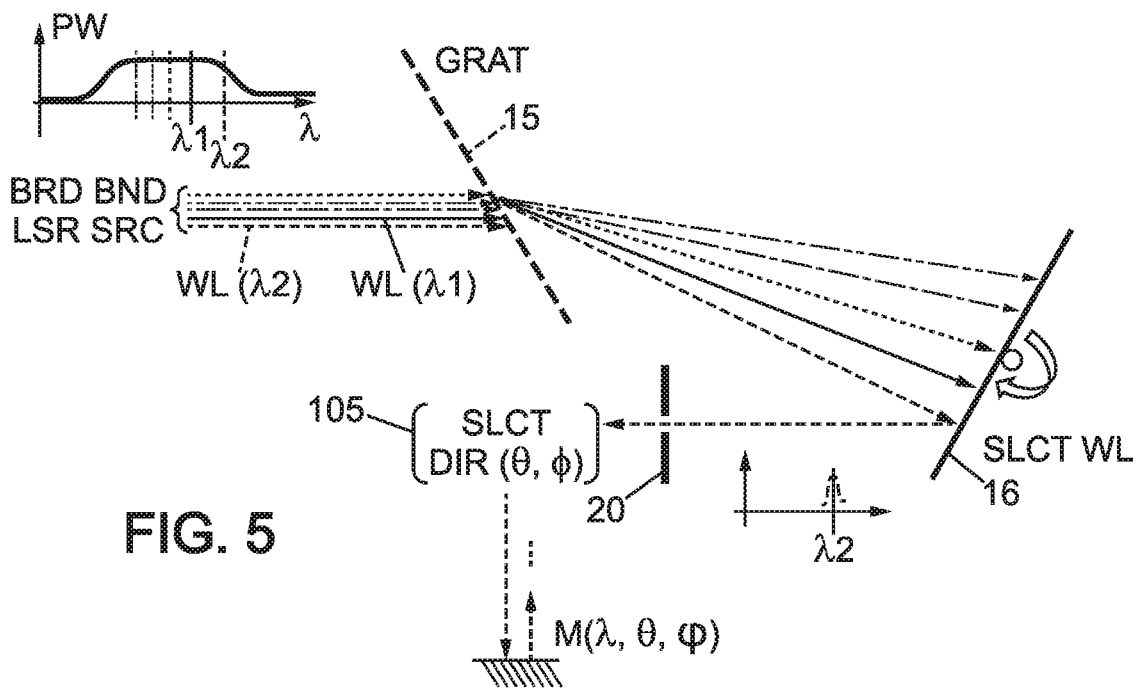
FIG. 5 is a schematic of the detail pictured on FIG. 4 functionally working to select a second wavelength of the comb of FIG. 3, in accordance with specific embodiments of the invention disclosed herein.

In the example of FIG. 4, the selected wavelength channel is the first wavelength channel, whereas in the example of FIG. 5, the selected wavelength channel is the second wavelength channel.

The orientable scanner mirror 16 may be a micro-electrical-mechanical (MEMS) system or any scanning mechanism controlled by the control unit 6. For instance, the orientable scanner mirror 16 is a 1-dimensional MEMS mirror. For instance, the orientable scanner mirror 16 has a diameter around 4 mm.

The scanning unit 105 according to the invention may comprise a fixed mirror 17 that deflects the light received from the wavelength selection unit 104 onto a scanning device 19 which can steer the received light in the selected local direction, under control of the control unit 6.

For instance, the scanning unit 105 comprises a galvanometer scanner, in order to achieve a fast scan. As an alternative, the scanning unit 105 may comprise a polygon scanner or a raster polygon scanner. Besides, as a preferred alternative, the scanning unit 105 may alternatively comprise 2-dimensional MEMS, or a 1-dimensional MEMS and some prisms. The MEMS may for example have a diameter around 4 mm.

For instance, some convenient MEMS mirrors may be referred S12237-03P by the manufacturer HAMAMATSU®.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A scanning device for laser detection and ranging (LiDAR), the scanning device comprising, arranged in optical free space:
    an optical input for receiving a pulsed broadband laser beam, the pulsed broadband laser beam having a linear polarization;
    a separating unit configured for transmitting the pulsed broadband laser beam along a scanning optical path while changing the linear polarization into a circular polarization;
    a wavelength selection unit configured for:
    receiving the pulsed broadband laser beam from the separating unit,
    filtering the pulsed broadband laser beam in order to get a filtered laser beam having a current wavelength that can be selected among a plurality of selectable wavelengths, and deflecting the filtered laser beam on a scanning unit along the scanning optical path to result in a deflected filtered laser beam,
    the scanning unit being configured:
    to steer the deflected filtered laser beam along a plurality of current local directions inside a predefined solid angle,
    to receive reflections of the filtered laser beam, the reflections coming back from surroundings, the reflections having an orthogonal circular polarization compared to the circular polarization of the pulsed broadband laser beam, and
    to transmit back the received reflections to the separating unit through the wavelength selection unit along a detection optical path, wherein the detection optical path and the scanning optical path have a same light path through the wavelength selection unit and the scanning unit, but opposite direction of light propagation,
    wherein the separating unit is further configured for deviating the reflections on a broadband detector while changing the orthogonal circular polarization into an orthogonal linear polarization compared to the linear polarization of the pulsed broadband laser beam,
    the broadband detector being configured
    to receive deviated reflections deviated by the separating unit, and
    to detect a time-of-flight and an optical power of the deviated reflections.

2. The scanning device according to claim 1, wherein the broadband detector is a single, non-tunable, detector.

3. The scanning device according to claim 1, wherein the separating unit comprises:
- a polarizing beam splitter configured to perform said transmitting of the pulsed broadband laser beam along the scanning optical path and to deviate the reflections along the detection optical path, and
- an optical component being disposed on a same light path between the polarizing beam splitter and the wavelength selection unit and being configured to convert a linear polarization into a circular polarization along the scanning optical path and to convert an orthogonal circular polarization into an orthogonal linear polarization along the detection optical path.

4. The scanning device according to claim 1, wherein the reflections are deviated at a predefined angle to give the deviated reflections, such that the deviated reflections reach the broadband detector.

5. The scanning device according to claim 1, wherein the wavelength selection unit comprises a grating for diffracting the pulsed broadband laser beam, and a mirror, one of the grating and the mirror being orientable, whose orientation is adjustable in order to select a $1^{st}$ order of a selected wavelength diffracted beam.

6. The scanning device according to claim 5, wherein the selected wavelength diffracted beam has a FWHM up to 30 nm.

7. The scanning device according to claim 5, wherein the selected wavelength diffracted beam has a FWHM in the range of 10 nm to 20 nm.

8. The scanning device according to claim 1, wherein the plurality of selectable wavelengths are spaced with each other by at least 10 nm.

9. The scanning device according to claim 1, wherein the plurality of selectable wavelengths are spaced with each other by 15 nm.

10. The scanning device according to claim 1, wherein the plurality of selectable wavelengths are spaced with each other by 20 nm.

11. The scanning device according to claim 1, wherein the plurality of selectable wavelengths are in the range of 900 nm to 1700 nm.

12. The scanning device according to claim 1, wherein the plurality of selectable wavelengths comprises at least three wavelengths.

13. The scanning device according to claim 1, wherein the plurality of selectable wavelengths comprises at least five wavelengths.

14. The scanning device according to claim 1 wherein the plurality of selectable wavelengths comprises at least ten wavelengths.

15. The scanning device according to claim 1, further comprising a broadband laser source configured to send the pulsed broadband laser beam to the separating unit through the optical input.

16. The scanning device according to claim 1, wherein the pulsed broadband laser beam has a frequency above 300 kHz.

17. The scanning device according to claim 1, wherein the predefined solid angle has a horizontal angular dimension in the range of 45 degrees to 360 degrees and a vertical angular dimension in the range of 10 degrees to 180 degrees.

18. The scanning device according to claim 1, wherein the predefined solid angle has a horizontal angular dimension in the range of 90 degrees to 180 degrees and a vertical angular dimension in the range of 20 degrees to 90 degrees.

19. The scanning device according to claim 1, wherein the predefined solid angle has a horizontal angular dimension of 120 degrees and a vertical angular dimension of 30 degrees.

20. The scanning device according to claim 1, further comprising:
- a memory configured to store a set of wavelength values corresponding to the plurality of selectable wavelengths,
- the scanning device further comprising:
- processing means configured for the scanning device to successively select a wavelength current value in the set of wavelength values at a wavelength selection rate, wherein the wavelength selection rate is higher than 3 Hz, and controlling means configured to control the wavelength selection unit in order to tune the wavelength selection unit to a wavelength current value.

21. The scanning device according to claim 20, further comprising:
- driving means configured to control the scanning unit for steering said deflected filtered laser beam along said plurality of current local directions inside said predefined solid angle, and
- the scanning device being further configured to record in the memory an optical power and a time-of-flight in relation with the current wavelength value and coordinates of a current local direction.

22. The scanning device according to claim 17 and according to claim 21, wherein the scanning unit is configured for:
- vertically scanning the entire vertical angular dimension of the solid angle, the vertical scanning being repeatedly performed at a vertical scan frequency, and
- horizontally scanning the entire horizontal angular dimension of the solid angle, the horizontal scanning being repeatedly performed at a horizontal scan frequency.

23. The scanning device according to claim 22, wherein a wavelength selection rate is lower than the horizontal scan frequency and the vertical scan frequency.

24. The scanning device according to claim 22, wherein the horizontal scan frequency is at least 10 times higher than a wavelength rate.

* * * * *